United States Patent
Hayotte (10) Patent No.: US 10,589,602 B2
(45) Date of Patent: *Mar. 17, 2020

(54) MOTOR VEHICLE DOOR MODULE COMPRISING A WINDOW REGULATOR SYSTEM

(71) Applicant: FAURECIA INTERIEUR INDUSTRIE, Nanterre (FR)

(72) Inventor: Sébastien Hayotte, Villeneuve la Garenne (FR)

(73) Assignee: FAURECIA INTERIEUR INDUSTRIE, Nanterre (FR)

(*) Notice: Subject to any disclaimer, the term of this patent is extended or adjusted under 35 U.S.C. 154(b) by 0 days.

This patent is subject to a terminal disclaimer.

(21) Appl. No.: 15/200,645

(22) Filed: Jul. 1, 2016

(65) Prior Publication Data
US 2016/0312507 A1 Oct. 27, 2016

Related U.S. Application Data

(63) Continuation of application No. 13/820,424, filed as application No. PCT/FR2011/052015 on Sep. 2, 2011, now Pat. No. 9,409,466.

(30) Foreign Application Priority Data

Sep. 2, 2010 (FR) .................................... 10 56966

(51) Int. Cl.
*B60J 5/04* (2006.01)
*E05F 11/38* (2006.01)
(Continued)

(52) U.S. Cl.
CPC ............... *B60J 5/0416* (2013.01); *B60J 1/08* (2013.01); *E05D 15/16* (2013.01); *E05F 11/382* (2013.01);
(Continued)

(58) Field of Classification Search
CPC ........ B60J 5/0416; E05D 15/16; E05F 15/689
(Continued)

(56) References Cited

U.S. PATENT DOCUMENTS 4,785,585 A 11/1988 Grier et al.
4,937,977 A 7/1990 Gergoe et al.
(Continued)

FOREIGN PATENT DOCUMENTS

DE 202007003226 U1 7/2008
DE 102008058906 A1 * 5/2010 ............ B60J 5/0416
(Continued)

OTHER PUBLICATIONS

Machine translation of DE-102008058906-A1.*
(Continued)

*Primary Examiner* — Marcus Menezes
(74) *Attorney, Agent, or Firm* — Reising Ethington P.C.

(57) ABSTRACT

The invention relates to a door module (1) of the type formed by a single part and from a single injected material, which module comprises a substantially flat supporting face (2) and at least one guide rail (34) of a window regulator system, said rail (34) being intended to guide and maintain a motor vehicle window supporting device (32). The rail (34) forms at least part of one of one of the side end parts (4) of the supporting face (2), said rail (34) extending continuously with the rest of the module (1) and forming a projection (40) in relation to the supporting face (2). The rail (34) extends in at least two planes different from the plane of the supporting face (2).

14 Claims, 4 Drawing Sheets

(51) Int. Cl.
    *E05F 15/00* (2015.01)
    *E05F 15/689* (2015.01)
    *B60J 1/08* (2006.01)
    *E05D 15/16* (2006.01)

(52) U.S. Cl.
    CPC .......... *E05F 15/00* (2013.01); *E05F 15/689* (2015.01); *E05Y 2201/612* (2013.01); *E05Y 2800/29* (2013.01); *E05Y 2900/55* (2013.01)

(58) Field of Classification Search
    USPC .......................................... 49/348, 349, 352
    See application file for complete search history.

(56) References Cited

U.S. PATENT DOCUMENTS

| | | | |
|---|---|---|---|
| 5,425,206 A | 6/1995 | Compeau | |
| 6,161,337 A * | 12/2000 | Morando | B60J 5/0416 49/348 |
| 6,185,872 B1 * | 2/2001 | Seeberger | B60J 5/0416 49/502 |
| 6,301,835 B1 * | 10/2001 | Pfeiffer | B60J 5/0416 296/146.5 |
| 6,553,720 B2 * | 4/2003 | Merlet | E05F 11/382 49/440 |
| 6,857,688 B2 | 2/2005 | Morrison et al. | |
| 6,874,279 B1 * | 4/2005 | Weber | B60J 5/0416 49/348 |
| 7,424,788 B2 * | 9/2008 | Kirejczyk | E05F 11/483 49/352 |
| 7,980,027 B2 * | 7/2011 | Kraus | B60J 1/16 49/209 |
| 7,992,347 B2 * | 8/2011 | Roy | B60J 5/0413 296/146.7 |
| 8,595,978 B2 | 12/2013 | Rietdijk | |
| 9,409,466 B2 | 8/2016 | Hayotte | |
| 2002/0007598 A1 * | 1/2002 | Nishikawa | B60J 5/0416 49/502 |
| 2002/0066232 A1 | 6/2002 | Tatsumi et al. | |
| 2002/0095870 A1 | 7/2002 | Praud et al. | |
| 2004/0049988 A1 * | 3/2004 | Reul | B60J 5/0416 49/502 |
| 2004/0065018 A1 * | 4/2004 | Regnier | E05F 11/485 49/352 |
| 2006/0000149 A1 * | 1/2006 | Radu | B60J 5/0416 49/502 |
| 2006/0196122 A1 | 9/2006 | Urieta et al. | |
| 2007/0251149 A1 | 11/2007 | Kirejczyk et al. | |
| 2009/0051193 A1 | 2/2009 | Hernandez et al. | |
| 2009/0282744 A1 | 11/2009 | Jung | |
| 2011/0078957 A1 * | 4/2011 | Deschner | B60J 5/0416 49/352 |
| 2011/0308163 A1 * | 12/2011 | Roy | B60J 5/0416 49/352 |

FOREIGN PATENT DOCUMENTS

| | | | | |
|---|---|---|---|---|
| EP | 1034953 A1 | 9/2000 | | |
| EP | 1296012 A2 * | 3/2003 | ............ | E05B 83/36 |
| FR | 2788022 A1 | 7/2000 | | |
| FR | 2920183 A1 | 2/2009 | | |
| WO | WO2008112750 A1 | 9/2008 | | |
| WO | WO2010003841 A1 | 1/2010 | | |

OTHER PUBLICATIONS

International Search Report corresponding to International application No. PCT/FR2011/052015, dated Jan. 23, 2012, 2 pages.
Extended European Search Report, in French, corresponding with application No. EP15177329, dated Nov. 11, 2015, 7 pages.

* cited by examiner

MOTOR VEHICLE DOOR MODULE COMPRISING A WINDOW REGULATOR SYSTEM

TECHNICAL FIELD

The present invention relates to a door module for a motor vehicle, formed by a single part and from a single injected material, said module comprising a substantially flat supporting face and at least one guide rail of a window regulator system, such a rail being designed to guide and maintain a motor vehicle window supporting device.

BACKGROUND

Door modules are parts, for example made from plastic, intended to be mounted on the door of a motor vehicle so as to contain certain functions of the door therein while lightening it. These functions are for example the window regulator system, the inner handle, a speaker support, electrical cable holders, etc.

The door module for example incorporates a guide rail for a window regulator system making it possible to guide the translation of a support device of a window so as to move it between an open position and a closed position.

Document FR-2 920 183 for example describes a door module comprising a guide rail formed by a rib, i.e., a straight segment protruding from the flat surface of the door module. Such a rib is not satisfactory, as it only makes it possible to maintain the support device in one direction, i.e. a direction substantially perpendicular to the direction in which the rib extends. This unidirectional support is too fragile, and the support device may leave the rib, for example in case of impact, the window then no longer being supported by the door module.

The door module also generally incorporates a sealing ring making it possible to ensure sealing with the door of the vehicle when the module is mounted. Such a seal extends over the entire periphery of the module, including beyond the rails, and is made in a single piece with the door module. However, such a seal prevents simple production of the door module if one also wishes for the door module to comprise a guide rail with a more complex shape than a rib so as to ensure effective maintenance of the support device. In fact, in that case, if one wishes to make the door module in a single piece, it is necessary to provide moving drawers to form the rail with a complex shape protruding relative to the flat surface of the module and the sealing ring. The injection mold is then complicated by the presence of several drawers in addition to the two mold parts, and the method for producing the module requires steps for controlling the movement of the drawers in addition to the opening and closing of the mold. The door module is then more expensive to produce and the production rhythms are reduced.

SUMMARY

One aim of the invention is to offset these drawbacks by proposing a door module comprising a guide rail ensuring effective maintenance of the window support device and capable of incorporating a large number of functions of the door while being easy to produce in a single injection operation.

To that end, the invention relates to a door module of the aforementioned type, wherein said rail forms at least one part of one of the lateral end parts of the supporting face, said rail extending continuously with the rest of the module and forming a projection in relation to the supporting face, said rail extending in at least two planes different from the plane of the supporting face.

Providing a rail extending in at least two planes different from the plane of the supporting face makes it possible to maintain the window support device effectively, both in the direction in which the rail extends and in the directions perpendicular to that direction. Furthermore, since the rail is part of one of the lateral end parts of the module, it is not necessary to provide moving drawers in the mold to produce the rail. The door module is therefore extremely simple, fast and inexpensive to produce.

According to other aspects of the door module:
- the door module comprises two guide rails of a window regulator system, each rail forming at least one part of a lateral end part of the supporting face, said rails extending continuously with the rest of the module and each forming a projection relative to the supporting face, such rails each extending in at least two planes different from the plane of the supporting face;
- the rail comprises a first branch extending substantially in a transverse plane from the supporting face and a second branch extending substantially in a longitudinal plane from the first branch;
- the door module comprises at least one speaker support formed by an opening in the supporting face;
- the door module comprises at least one support for receiving an inside door handle;
- the door module comprises at least one means for supporting actuating means of the window regulator system;
- the door module comprises at least one means for receiving functional cables of the motor vehicle;
- the door module comprises means for reinforcing the module, said means being formed by a plurality of ribs protruding from the supporting face;
- the single injected material is a polypropylene-based plastic reinforced with glass fibers.

The invention also relates to a motor vehicle door comprising an opening for receiving a door module, a door module as described above being fixed in said receiving opening, a window regulator system being assembled on said door module, said system comprising at least one device for supporting a window slidably mounted on the rail of the door module.

The invention also relates to a method for producing a door module as described above, comprising a single step for injecting a single material into an injection mold comprising only two mold parts and a step for stripping the module by separating the two parts of the mold.

BRIEF DESCRIPTION OF THE DRAWINGS

Other aspects and advantages of the invention will appear upon reading the following description, which is provided as an example and done in reference to the appended drawings, in which.

DESCRIPTION OF THE ILLUSTRATED EMBODIMENT

In the description, the term "longitudinal" is defined relative to the planes parallel to the plane in which the supporting face of the door module extends, and the term "transverse" is defined relative to the planes perpendicular to the longitudinal planes.

Figure 1:
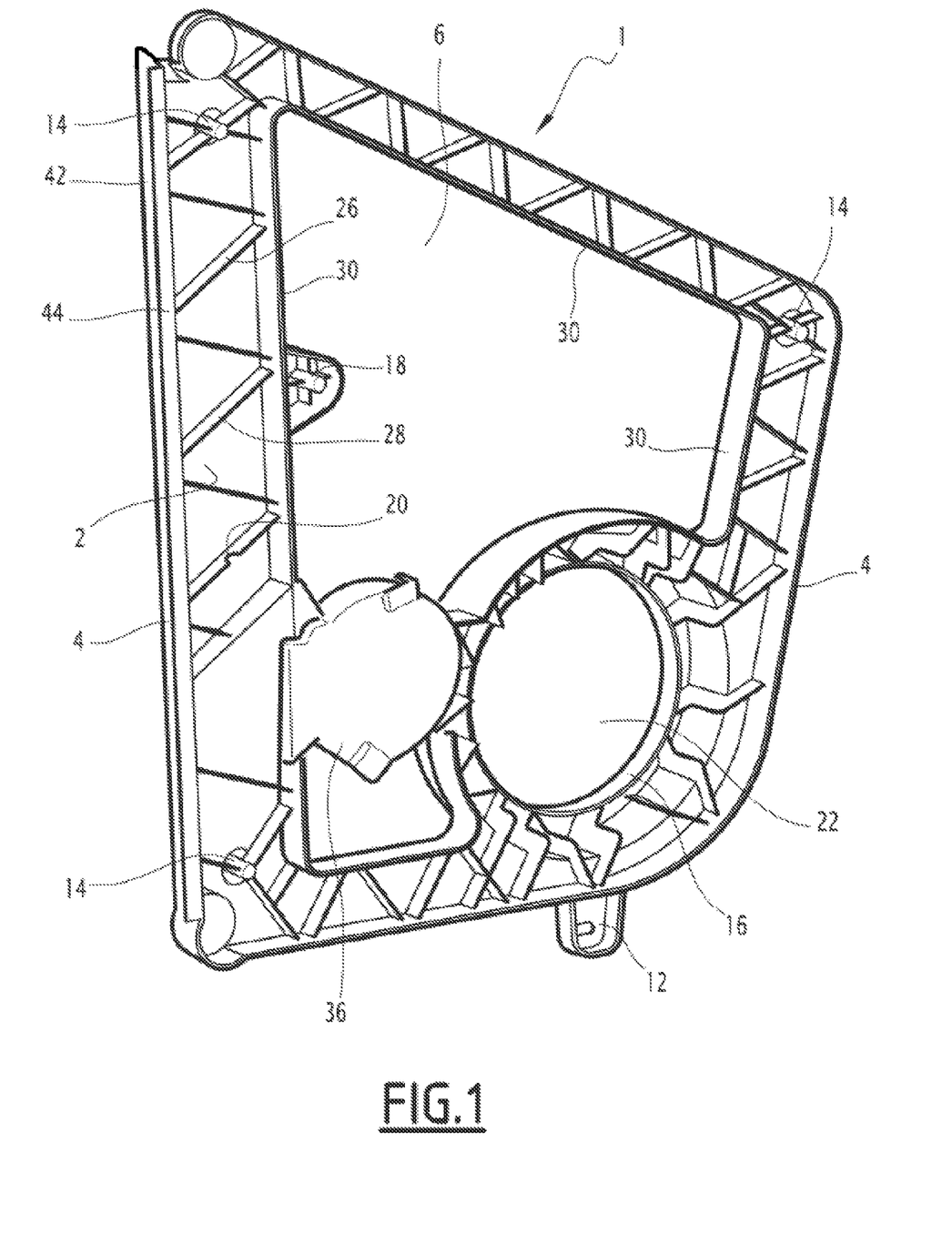
FIG. 1 is a diagrammatic perspective illustration of a door module according to a first embodiment of the invention.
Figure 3:
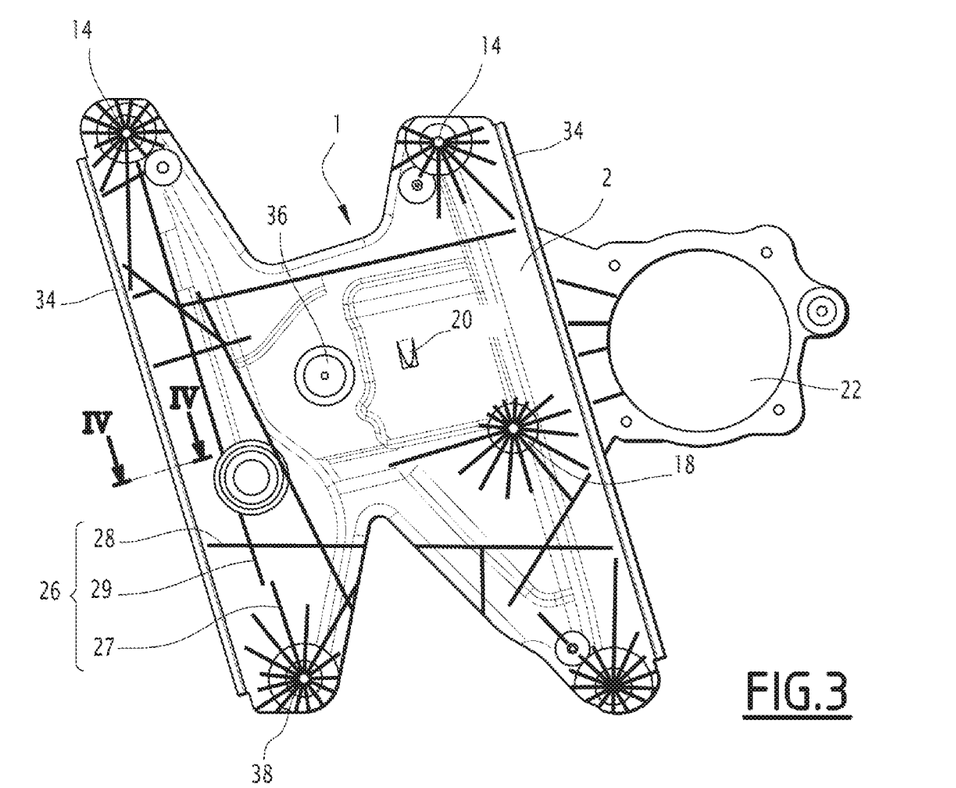
FIG. 3 is a diagrammatic perspective illustration of a door module according to a second embodiment of the invention.

In reference to FIGS. 1 and 3, a door module 1 is described that is made from a single part and from a single injected plastic. "Made from a single part" means that the door module 1 is a single unit, all of the component elements thereof being made simultaneously, continuously in a same piece. "From a single plastic material" means that a single product is used to perform the injection of the door module 1, even if that product is a mixture of several different materials.

In this way, the door module 1 according to the invention is made from a plastic. The door module for example comprises glass fiber reinforced polypropylene. The material used is for example known under the acronym PP LGF (polypropylene long glass fibers).

The door module comprises a substantially flat supporting face 2 extending longitudinally between two lateral end parts 4 forming the outer edges of the door module 1 along the width thereof. The supporting face 2 may have varied shapes depending on the architecture of the door and the number of functions included in the door module 1. As an example, the supporting face 2 shown in FIG. 1 is in the shape of a square surrounding a central opening 6, while the supporting face 2 shown in FIG. 3 is substantially continuous between the lateral end parts 4 and is substantially X-shaped. Other shapes can of course also be considered.

Figure 2:
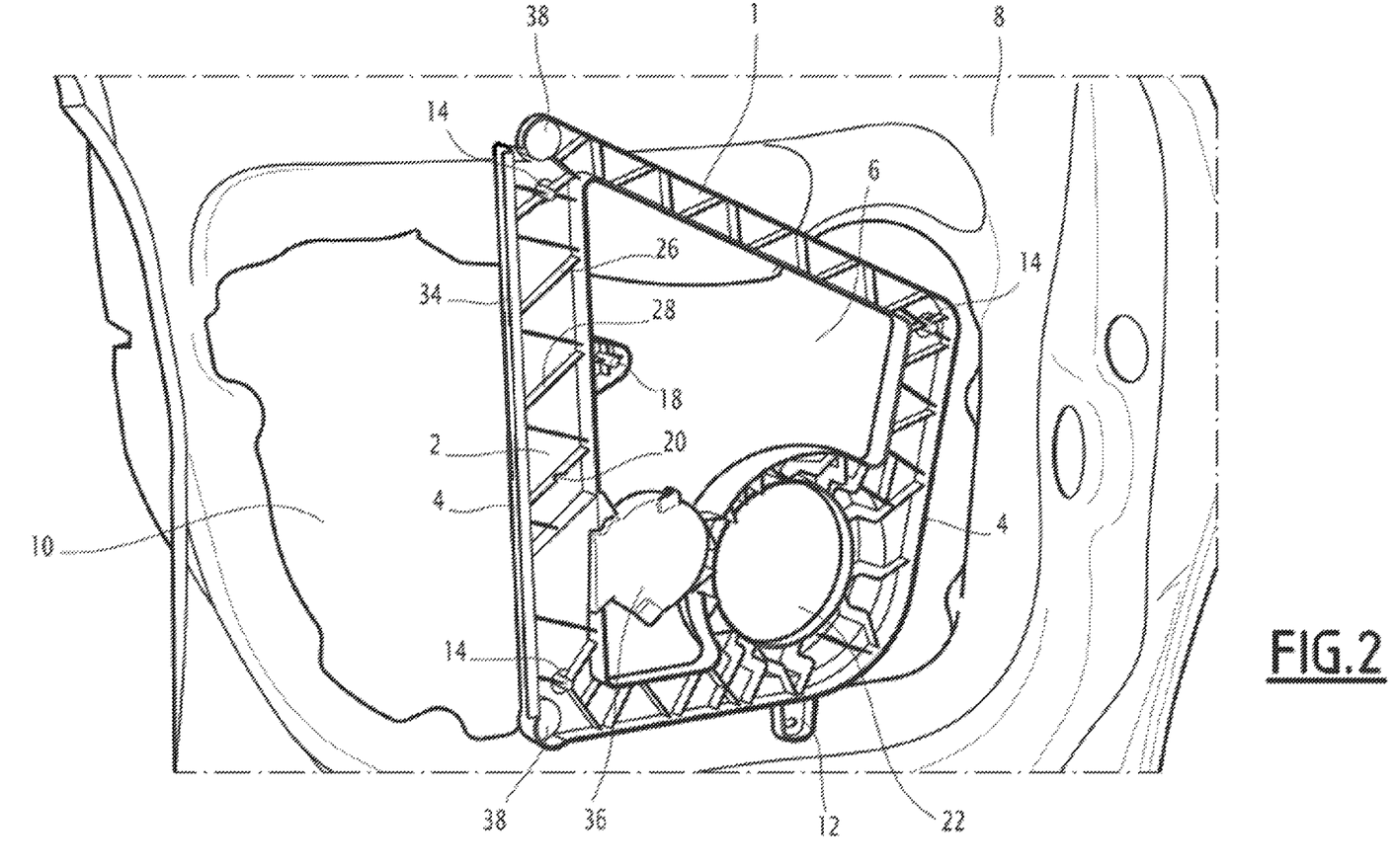
FIG. 2 is a diagrammatic perspective illustration of the door module of FIG. 1 received in a motor vehicle door.

As shown in FIG. 2, the door module 1 remains fixed to a motor vehicle door 8, in particular in an opening 10 thereof. To that end, the door module 1 comprises means for fixing to the door, such as fastening tabs 12 or threaded barrels 14.

Aside from these fastening means, the door module 1 makes it possible to incorporate a large number of functions of the door by injecting in a single part means making it possible to perform those functions during the injection of the door module.

In this way, the door module for example comprises part of a window regulator system, described later, a speaker support 16, a support for receiving an inside handle 18, at least one means 20 for receiving functional cables of the motor vehicle, such as electrical cables. Other functions may of course be included on the door module, such as support means for an armrest, a parcel tray, etc.

The speaker support 16 is for example formed by an opening 22 formed in the supporting face 2 and comprising means for fitting the speaker as shown in FIG. 1 or openings or barrels for fastening the speaker as shown in FIG. 3.

The support 18 for receiving an inside handle is for example formed by one or more fastening points making it possible to mount the inner handle rotatably.

The means 20 for receiving functional cables is for example formed by a hook or notch making it possible to retain a bundle of cables. According to one embodiment, several hooks or notches are formed so as to form a cable path making it possible to orient and distribute the cables optimally.

The door module also comprises reinforcing means 26 for the module so as to give it the required stiffness. According to the embodiments shown in the figures, these reinforcing means 26 are formed by a plurality of ribs 28, 29 protruding substantially transversely from one side of the supporting face 2. The ribs 28, 29 are distributed optimally to guarantee the desired stiffness. According to the embodiment shown in FIGS. 1 and 2, the ribs 28 extend substantially in a sawtooth pattern between the transversely protruding edges of the supporting face 2 and delimiting that supporting face, such as the lateral edges 4 and the edges 30 extending over the periphery of the central opening 6. The ribs 28 therefore extend slanted relative to the lateral edges 4 and limit the bending of a section substantially perpendicular to those edges under the action of a transverse effect. It should be noted that the lateral edges 4 and the edges 30 formed by ribs with a greater height than the ribs 28 create part of the stiffening means 26. In fact, said edges 4, 30 limit the bending of the supporting face 2 in the direction parallel thereto in the case of a transverse force. According to the embodiment shown in FIG. 3, ribs 27, 28, 29 extend over part of the surface of the supporting face 2 to create the reinforcing means 26. The ribs 27 are for example distributed "in a star" from certain fastening points of the door module 1, other ribs 28 extending through the supporting face 2 or slanted relative to the lateral edges 4 to increase the stiffness of the module. The ribs 29 extend parallel to the lateral edges 4 and limit the bending thereof. Such ribs 27, 28, 29 make it possible to increase the stiffness of the door module 1 simply, without adding a significant weight thereto.

The notches forming means 20 for receiving functional cables are for example formed in some of the ribs 28, as shown in FIG. 1.

The window regulator system partially formed with the door module 1 is for example a cable or Bowden tube system. In such a system, at least one support device 32 (partially shown in FIG. 4) for a window (not shown) is translated along at least one guide rail 34 using at least one cable (not shown) actuated by an actuating means such as a drum (not shown) actuated manually or by a motor (not shown). Depending on the arrangement of the window regulator system, the cable(s) may pass around one or more pulleys (not shown) arranged appropriately. Translating the support device 32 makes it possible to move the window from an open position to a closed position and vice versa.

The door module 1 comprises, incorporated in a single part with the supporting face 2, the guide rail 34 and the support means 36 for the means for actuating the window regulator system and potentially support means 38 for the pulleys. The cable receiving means 20 may also be used for the passage of the cables actuating the window regulator system.

According to the embodiment shown in FIGS. 1 and 2, the door module 1 comprises a single guide rail 34, for a so-called "single-lift" window regulator system. This rail 34 forms at least one part of one of the lateral end parts 4 of the supporting face 2 and forms a projection 40 relative to the supporting face 2, i.e., the rail 34 protrudes relative to the supporting face 2. According to one embodiment, the rail 34 forms the entirety of one of the lateral end parts 4 of the supporting face.

According to the embodiment shown in FIG. 3, the door module 1 comprises two guide rails 34, for a so-called "double-lift" window regulator system. Each rail 34 forms at least one part of a lateral end part 4 of the supporting face 2, i.e., the two lateral end parts 4 partially form a rail 34.

These rails each form a projection 40 relative to the supporting face 2, i.e., the rails 34 protrude relative to the supporting face 2. According to one embodiment, each rail 34 forms the entirety of one of the lateral end parts 4 of the supporting face 2.

A guide rail 34 will now be described in more detail.

The rail 34 forms part of one of the lateral end parts 4 of the supporting face 2, i.e., the rail 34 extends toward the outside of the supporting face 2 in the longitudinal direction and there is no other element of the door module 1 beyond the rail in that longitudinal direction.

Figure 4:
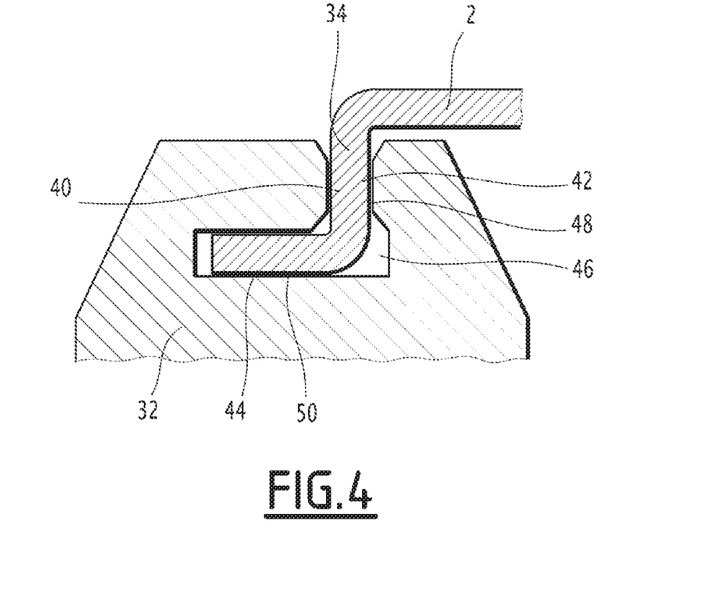
FIG. 4 is a diagrammatic cross-sectional view along axis IV-IV of FIG. 3, a window support device being received on the guide rail.

The rail 34 extends in at least two planes different from the plane in which the supporting face 2 extends. Thus, as shown in FIG. 4, the rail 34 for example comprises a first branch 42 extending substantially in a transverse plane from the supporting face 2 continuously with said supporting face 2, said branch 42 forming the projection 40, and a second branch 44 extending substantially in a longitudinal plane, parallel to the plane of the supporting face 2, from the first branch 42 and toward the outside of the support module 1. Since the rail 34 extends continuously with the supporting face 2, no opening is provided in the rail 34 or at the transition between the rail 34 and the supporting face 2. This avoids having to provide means for sealing such an opening. The first branch 42 of course participates in strengthening the supporting face 2. This is done similarly to the ribs 29 due to its arrangement in a transverse plane and its direction combined with the lateral edge 4.

The support device 32 is configured to surround the rail 34, as shown in FIG. 4, and therefore comprises an opening 46 having a slit 48 extending transversely emerging over a slit 50 extending longitudinally. It will easily be understood that such a shape of the rail 34 and support device 32 makes it possible to ensure maintenance in the longitudinal and transverse directions of the window support device 32 so as to ensure effective and robust support for the window. In this way, the rail 34 ensures both the translational guiding and maintenance of the support device 32.

Figure 5:
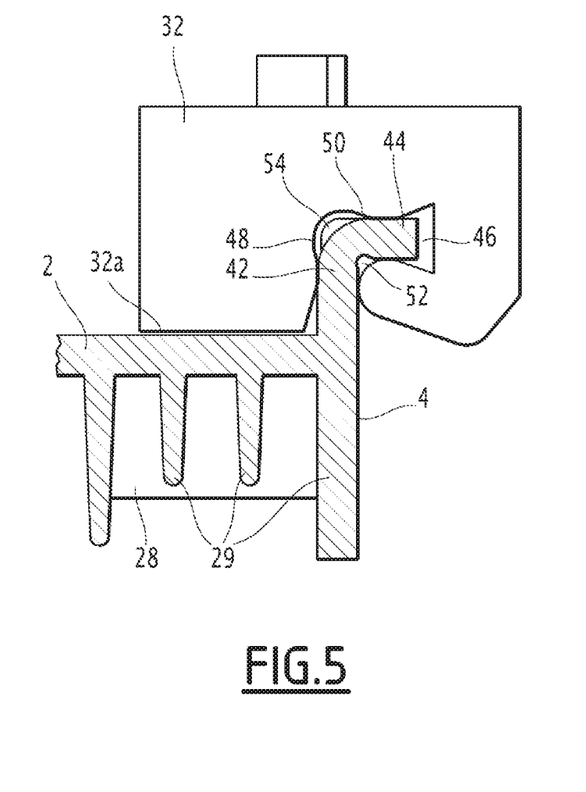
FIG. 5 is a view similar to FIG. 4 of one alternative embodiment.

FIG. 5 shows an alternative embodiment of the diagrammatic illustration of FIG. 4. The lateral edge 4 of the supporting face has a rail provided with a support device, or slider, 32. The slider 32 shown diagrammatically is of a known type. The transverse and longitudinal slits 48, 50 have bosses suitable for coming into contact, with a certain resilience, respectively on the first and second branches 42, 44 of the rail. In this way, the slider 32 has limited and opposite contact areas with each rail plane and slides without play.

It will be noted that the slider 32 has a large face 32a adjacent to the supporting face 2. The slider 32 is therefore prevented from rotating around the rail, here in the counterclockwise direction, and the end of the supporting face 2 participates in the guiding.

A slanted rib 28 and four ribs 29 parallel to the edge 4 are shown in FIG. 5. As in the case of the corresponding ribs of the embodiment of FIG. 3, these ribs 28, 29 form reinforcing means.

The rib 29 parallel to the end of the supporting face 2, on the right in FIG. 5, itself forms the lateral edge 4. Thus, the lateral edge 4 comprises a lateral reinforcing rib that extends at least partially along that edge, and preferably over the entire length of the rail. This makes it possible to concentrate the reinforcing means in a significantly stressed portion of the door module due to the presence of the rail and the forces exerted by the slider 32. It should be noted that the windows of current vehicles are often rounded. The rail must then also be rounded and preserve the geometry of that curve and preserve the geometry of that curve during movements of the window.

Still regarding the right-hand parallel rib 29, it must be noted that it extends transversely on either side of the plane of the supporting face 2 and that the portion thereof situated on one side of that plane forms the first branch 42 of the guide rail. In this way, a portion of the door module, i.e., the first branch 42, performs both a guiding function and a strengthening function. The same is true for the end portion of the supporting face 2 along which the face 32a of the slider slides and which is reinforced by two parallel ribs 29. This makes it possible to save plastic and therefore reduce the weight of the module.

Still with the aim of stiffening and saving weight, corner pieces 52 and reinforcing fins 54 are provided inside and outside the corner between the first and second branches 42, 44 of the rail.

Other rail shapes 34 may be considered. In particular, a third branch extending in a transverse plane may be added so as to extend from the free part of the second branch 44. It is possible to provide a rail corresponding to a standard rail shape already used by automobile builders. In this way, it would not be necessary to provide a window support device, or slider, specific to the rail 34 of the support module 1. This would make it possible to limit the modifications that must be made to existing production lines to produce the support device or the window regulator system in general.

Due to the absence of sealing rings on the periphery of the door module, there is no element of that module that extends beyond the rail(s) 34 in the longitudinal direction toward the outside of the supporting face 2. This makes it possible to produce the door module described above particularly simply from a mold simply having two mold parts defining a molding cavity between them when the parts are pressed against each other. In fact, the shape of the rail allows natural stripping of the door module by simply separating the two mold parts from each other. It is therefore not necessary to provide an additional movable drawer for stripping the rail 34. This is also applicable for more complex rail shapes, as long as the stripping can be done by simply separating the mold parts.

It is possible to have a localized element that extends beyond the rail, such as the speaker support shown in FIG. 3. In that case, only a small localized drawer is necessary to strip the rail at that support. However, that drawer is small and does not extend over the entire length of the rail, as is the case when the sealing ring is provided. The stripping therefore remains relatively simple and inexpensive.

Furthermore, the lack of sealing rings makes it possible to save substantially on material and significantly lighten both the door module produced and the door structure comprising that door module. In fact, aside from the material saved in the module, the lack of a seal makes it possible to eliminate the bearing track for that sealing ring on the lining of the door, which also makes it possible to save in terms of material and mass. As an example, such a door module makes it possible to lighten a vehicle comprising a door equipped with a door module as described above by 3 to 4 kg relative to the mass of a motor vehicle equipped with traditional doors. The sealing between the door module 1 and the door 8 may be ensured traditionally, for example using a sheet of impermeable material, which is easily placed and lightweight.

The door module described above is therefore particularly simple and cost-effective to produce, while offering effective maintenance of the window support device and making it possible to reduce the general mass of the motor vehicle door.

The door module also makes it possible to combine a large number of functions of the vehicle door, simply and configurably, by simply modifying the shape of the injection cavity.

The invention claimed is:

1. A door module for a motor vehicle, formed by a single part and from a single injected material, said door module comprising a substantially flat supporting face and at least one guide rail of a window regulator system, said guide rail being configured to guide and maintain a motor vehicle window supporting device,
wherein said guide rail forms at least one part of a lateral end part of the supporting face,
wherein the supporting face frames a central opening, the supporting face being delimited by a plurality of edges protruding from the supporting face, the guide rail forming at least one part of one of said edges, another one of the edges surrounding and extending along a periphery of the central opening, and at least one other of the edges extending away from said lateral end part and along a periphery of the supporting face, and
wherein the door module comprises a plurality of reinforcing ribs protruding from the supporting face, said reinforcing ribs extending from the edge surrounding and extending along the periphery of the central opening to each other one of said edges, wherein the plurality of edges protruding from the supporting face includes first, second, third, and fourth edges along the periphery of the supporting face, the first edge being the edge formed at least in part by the guide rail, the second edge being located along an end of the supporting face laterally opposite the first edge, the third and fourth edges being said other edges extending away from the lateral end part, and the third and fourth edges extending between the first and second edges along opposite sides of the periphery of the supporting face, wherein the reinforcing ribs extend in a zig-zag pattern between the edge surrounding the central opening and each one of the first, second, third, and fourth edges.

2. The door module of claim 1, wherein said guide rail extends continuously with a remainder of the module and forms a projection in relation to the supporting face, said guide rail extending in at least two planes different from a plane of the supporting face.

3. The door module according to claim 1, wherein the guide rail comprises a first branch extending substantially in a first plane from the supporting face and a second branch extending substantially in a second plane from the first branch, the first and second planes being perpendicular.

4. The door module according to claim 1, comprising at least one speaker support formed by an opening in the supporting face.

5. The door module according to claim 1, comprising at least one support for an inside door handle.

6. The door module according to claim 1, comprising at least one window regulator system support.

7. The door module according to claim 1, comprising at least one cable retainer.

8. The door module according to claim 1, wherein the plurality of reinforcing ribs protruding from the supporting face extend in a zig-zag pattern between the edge surrounding the central opening and each other one of the edges protruding from the supporting face.

9. The door module according to claim 8, wherein at least some of the reinforcing ribs are slanted relative to the edge protruding from the supporting face and extending along the periphery of the central opening.

10. The door module according to claim 1, wherein at least the lateral end part having the guide rail comprises another reinforcing rib extending over at least part of said end part.

11. The door module according to claim 1, wherein the single injected material is a polypropylene-based plastic reinforced with glass fibers.

12. A motor vehicle door comprising the door module according to claim 1 fixed in a receiving opening of the door, the window regulator system being assembled on said door module, said window regulator system comprising at least one device for supporting a window slidably mounted on the guide rail of the door module.

13. A door module for a motor vehicle, formed by a single part and from a single injected material, said door module comprising a substantially flat supporting face and at least one guide rail of a window regulator system, said guide rail being configured to guide and maintain a motor vehicle window supporting device,
wherein said guide rail forms at least one part of a lateral end part of the supporting face,
wherein the supporting face frames a central opening, the supporting face being delimited by a plurality of edges protruding from the supporting face, the guide rail forming at least one part of one of said edges, and another one of the edges surrounding and extending along a periphery of the central opening,
wherein the door module comprises a plurality of reinforcing ribs protruding from the supporting face, said reinforcing ribs extending from the edge surrounding and extending along the periphery of the central opening to the edge forming at least in part by the guide rail, and
wherein said guide rail extends continuously with a remainder of the module and forms a projection in relation to the supporting face, said guide rail extending in at least two planes different from a plane of the supporting face,
the door module further comprising a speaker support configured to receive a speaker at a speaker opening formed in the supporting face and for attachment of the speaker to the door module at the speaker opening, wherein another one of the edges surrounds and extends along a periphery of the speaker opening, and the reinforcing ribs extend between the edge surrounding the central opening and the edge surrounding the speaker opening.

14. A door module for a motor vehicle, formed by a single part and from a single injected material, said door module comprising a substantially flat supporting face and at least one guide rail of a window regulator system, said guide rail being configured to guide and maintain a motor vehicle window supporting device,
wherein said guide rail forms at least one part of a lateral end part of the supporting face,
wherein the supporting face frames a central opening, the supporting face being delimited by a plurality of edges protruding from the supporting face, the guide rail forming at least one part of one of said edges, and another one of the edges surrounding and extending along a periphery of the central opening,
wherein the door module comprises a plurality of reinforcing ribs protruding from the supporting face, said reinforcing ribs extending from the edge surrounding and extending along the periphery of the central opening to the edge forming at least in part by the guide rail, and wherein said guide rail extends continuously with a remainder of the module and forms a projection in relation to the supporting face, said guide rail extending in at least two planes different from a plane of the supporting face, the door module further comprising a door handle support configured to receive and support an inside door handle of the vehicle and for attachment of the inside door handle to the door module, wherein at least a portion of the door handle support is located along the central opening of the door module and extends from the edge surround the central opening.

\* \* \* \* \*